Patented June 25, 1946

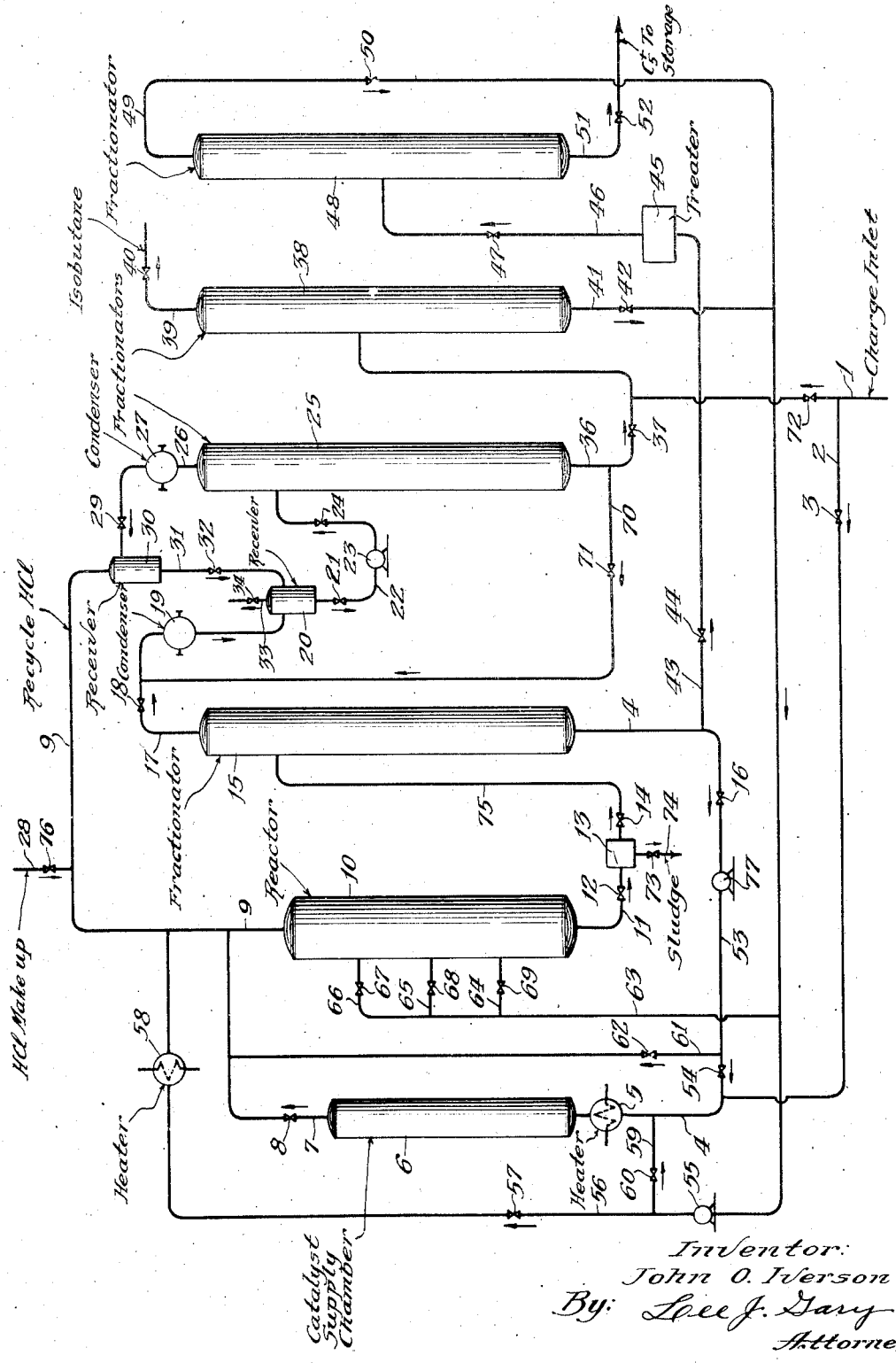

2,402,818

UNITED STATES PATENT OFFICE 2,402,818

ISOMERIZATION OF SATURATED HYDROCARBONS

John O. Iverson, Chicago, Ill., assignor to Universal Oil Products Company, Chicago, Ill., a corporation of Delaware Application March 31, 1943, Serial No. 481,286

8 Claims. (Cl. 260—683.5)

1

This invention relates particularly to the catalytic isomerization of isomerizable saturated hydrocarbons or hydrocarbon mixtures containing substantial amounts thereof, such as straight run petroleum fractions boiling in the motor fuel range. In a more specific sense, it is concerned with a particular mode of operation involving a series of closely cooperating steps which is particularly suitable for use in connection with granular metal halide catalysts of the Friedel-Crafts type such as aluminum chloride.

In recent years the isomerization of saturated hydrocarbons, particularly paraffinic hydrocarbons, has assumed considerable importance; thus normal butane which is the only normally gaseous paraffinic hydrocarbon capable of isomerization has been found to be considerably less reactive than isobutane since the latter compound is more easily alkylated with olefins in the presence of catalysts to form hydrocarbons of branched chain structure useful as antiknock ingredients in gasoline. Similarly isopentane and isomeric hexanes possess properties which make them much more suitable as ingredients in gasolines than the normal compounds. Normally liquid hydrocarbon mixtures such as straight run gasoline fractions either of close cut or rather wide boiling range may be isomerized to produce a mixture of isomers having a greatly increased antiknock rating over that possessed by the original charge.

It is well known that the isomerization of saturated isomerizable hydrocarbons may be effected by contacting said hydrocarbons with metallic halides of the Friedel-Crafts type such as the chlorides and bromides of aluminum, zirconium, zinc, iron or mixtures thereof. These halides may be used in a variety of ways for isomerization of hydrocarbons. One of the common methods, for example, employs aluminum chloride supported on relatively inert granular materials over which the hydrocarbon or hydrocarbon mixtures to be isomerized is passed in liquid, mixed or vapor phase along with a hydrogen halide such as hydrogen chloride or hydrogen bromide. More recent developments in continuous processes involve the passage of hydrocarbons to be isomerized through beds of granular aluminum chloride in substantially liquid phase and the further passage of the effluent therefrom containing aluminum chloride dissolved therein, into a reaction zone along with a hydrogen halide. The reaction zone is filled with a packing material such as Raschig rings, crushed firebrick, quartz, silica-alumina composites and similar packing materials which serve to maintain a definite amount

2 of active metal halide on the surface of the packing. The present invention discloses an improved process flow in this type of operation comprising a cooperation of individual steps which produces an operation in which the operating difficulties commonly encountered are obviated.

In one embodiment the present invention comprises a process for the conversion of isomerizable saturated hydrocarbons which comprises passing at least a portion of said hydrocarbons in substantially liquid phase through a bulk supply of aluminum halide catalyst under conditions such that a portion of the catalyst is dissolved therein, introducing the catalyst-containing stream from said supply into a confined reaction zone maintained under isomerizing conditions, and therein isomerizing a substantial portion of the hydrocarbon charge, introducing the reaction products to a fractionating zone and therein separating therefrom a fraction containing hydrocarbons higher boiling than the original charge and having dissolved therein a major portion of the aluminum halide catalyst entering said fractionating zone, and recovering the isomeric saturated hydrocarbons from the overhead product of said fractionating zone.

An essential feature of the present invention is the separation of the aluminum halide catalyst from the reaction products in solution in the fractionator bottoms prior to the separation of the hydrogen halide activator and isomeric products from the unconverted charge.

The removal of the aluminum halide catalyst from the reaction products is one of the most difficult problems to be overcome before the isomerization process can be deemed satisfactory for extensive commercial use. Various methods have been proposed such as passing the hydrocarbon catalyst stream through a bed of filtering medium to absorb or retain the catalyst on the filtering medium. The method herein presented possesses considerable advantages over the utilization of a filtering medium in that the aluminum halide is separated in a manner which permits its recycle to the reactor for further utilization.

To illustrate the necessity of separating the aluminum chloride catalyst prior to the fractionation of the reaction products for the removal of the hydrogen chloride promoter, let it be assumed that the reaction products are passed directly from the reaction zone into a fractionating zone wherein the hydrogen chloride promoter is removed in the overhead stream and recycled to the reaction zone. To obtain a recycle stream in which the hydrogen chloride promoter is sufficiently concentrated, it is necessary to operate the fractionator at a high pressure of the order of 200 to 540 pounds per square inch gauge to obtain satisfactory fractionation. In order to obtain a bottom fraction substantially free from hydrogen chloride high temperatures will have to be utilized and as a result of these high temperatures considerable reaction will occur between the dissolved aluminum chloride and hydrocarbons to form hydrocarbon-aluminum chloride sludges which will coat the surfaces of the reboiler of the fractionating zone and prevent effective heat transfer. If the conversion in the reaction zone is conducted in the vapor phase, the higher pressure in the hydrogen chloride fractionator renders it necessary to use a compressor or to condense the reaction products so that a pump may be used to introduce the reaction products into the hydrogen chloride fractionator. It has been found that compressors will not operate satisfactorily upon the mixtures of aluminum chloride and hydrocarbons leaving the reaction zone. The use of condensers to produce a charge which may be pumped satisfactorily into the hydrogen chloride fractionator introduces additional difficulties in that aluminum chloride deposits on the surfaces of the condenser and prevents effective cooling and condensation of the reaction products. If the reaction is conducted in the liquid or mixed phase so that the reaction products may be effectively pumped to the hydrogen halide fractionator, the difficulties due to the high temperatures in the bottom of this fractionator previously mentioned above are again encountered.

The operating difficulties previously enumerated are substantially obviated in accordance with the present invention by the incorporation in the process flow of a fractionating zone or column to separate the aluminum chloride in solution in the bottoms of said column prior to the separation of the hydrogen chloride and isomeric hydrocarbons from the unconverted and higher boiling materials. This fractionator may be effectively utilized whether the reaction is conducted in the liquid, mixed or vapor phase. The separation may be obtained at pressures and temperatures considerably lower than those necessary in the hydrogen chloride fractionator and thereby eliminates the difficulties arising from high temperatures in the bottom of the column. The reaction products, after passing through a preliminary separation step wherein aluminum chloride-hydrocarbon sludges are removed, may be introduced directly into the fractionator wherein the separation is controlled so that the overhead product contains substantially all of the hydrogen chloride promoter, isomeric hydrocarbons and a portion of the unconverted charge and a substantially hydrogen chloride free bottom fraction containing a portion of the unconverted charge and a sufficient quantity of higher boiling material to retain substantially all of the aluminum chloride catalyst dissolved therein. This material may be recycled to the reaction zone to further utilize the aluminum chloride catalyst dissolved therein. The removal of a portion of unconverted charge in the bottoms from this fractionator, which is recycled to the reaction zone with the recovered aluminum chloride decreases the load on the subsequent fractionating equipment.

Another advantage of the aluminum chloride fractionator is the elimination of expensive compressors in the process flow. The removal of the catalyst prior to the separation of the hydrogen chloride permits the use of higher pressures in the hydrogen chloride fractionator and the separated hydrogen chloride may be readily recycled without the use of compressors to obtain the pressure necessary to introduce the hydrogen chloride into the recator. A further advantage of the aluminum halide fractionator is the concentration of the aluminum chloride catalyst within one vessel in the fractionating system rather than scattered throughout the plant resulting in operating difficulties due to its presence in condensers, reboilers, and so forth.

Further advantages of the disclosed process flow will be evident from the following detailed description of the attached diagrammatic sketch which illustrates in conventional side elevation, one type of apparatus in which the objects of the invention may be accomplished.

To simplify the explanation of the drawing, it shall be considered in connection with the isomerization of normal butane using aluminum chloride promoted by hydrogen chloride as the isomerization catalyst. It is not intended, however, that this simplification should unduly limit the general broad scope of the invention since the apparatus herein described is suitable for the isomerization not only of butane but also of other saturated isomerizable hydrocarbons.

Referring to the drawing: A normal butane charge is introduced through line 1 and if it contains considerable isobutane, it is directed through valve 72 into line 36 through which it passes to fractionator 38 wherein the isobutane is separated therefrom and the normal butane is charged to the reactor in the manner hereinafter described. If the charge is composed essentially of normal butane, it is introduced through line 2 containing valve 3 through line 4 into heater 5 wherein it is heated to a temperature sufficiently high to compensate for any heat losses during its transfer and still maintain the desired temperature in the aluminum chloride supply tower 6. The aluminum chloride tower 6 is maintained at a temperature within the range of about 50 to 250° F. and preferably within the range of 150 to 200° F. under a pressure sufficient to maintain the normal butane in substantially liquid phase during its passage through this tower. Although only one catalyst supply tower is shown in the drawing, two or more towers connected in series or parallel may be used. When the catalyst supply in any tower becomes depleted, the tower may be by-passed while it is being cleaned and refilled and placed back in operation without disrupting the continuity of the process. The flow of hydrocarbon through the catalyst supply towers may be either in an upward or downward direction.

The normal butane stream leaving tower 6 containing aluminum chloride dissolved therein is directed through line 7 containing valve 8, commingled with various recycle streams obtained as hereinafter described, and the resulting mixture is directed through line 9 into reactor 10 wherein it is commingled with hydrogen chloride and a substantial portion of the normal butane is converted to isobutane. The temperature within reactor 10 will be dependent somewhat upon the hydrogen chloride concentration in the incoming reactants but will ordinarily be within the range of about 50 to about 350° F. and preferably between about 160 to about 250° F. The pressures will be varied from about slightly superatmospheric to pressures of the order of 125 to 550 pounds per square inch gauge. The hydrogen chloride concentration within reactor 10 may be varied from about 1 to about 40 mol percent depending upon the temperature used, but will ordinarily be within the range of about 5 to 20 mol percent. The reaction may be conducted in either the liquid, vapor, or mixed phases. The space velocity in the reactor, measured as volumes of charge per volume of packed space, may be varied between about 0.01 to 5 but is preferably between about 0.1 to about 0.75.

Reactor 10 may comprise a large cylindrical chamber filled with solid packing materials such as Raschig rings, crushed firebrick, alumina, quartz, silica-alumina composites and any of the ordinary refractory packing materials well known to those skilled in the art.

The reaction products leave reactor 10 through line 11 containing valve 12 and are directed into chamber 13 wherein heavy sludge-like materials consisting of aluminum chloride-hydrocarbon complexes are removed therefrom. This sludge is withdrawn from chamber 13 through line 73 containing valve 74 and is recovered as a product of the reaction. This sludge may be contacted with the various recycle streams to dissolve out any hydrogen chloride or free aluminum chloride which may be recycled to the process.

The sludge-free reaction products containing free aluminum chloride therein are withdrawn from chamber 13 through line 75 containing valve 14 and are directed into fractionator 15. The reaction products entering fractionator 15 may be either in the liquid, mixed or vapor phase depending upon the particular conditions of temperature and pressure used in reactor 10. Separation in fractionator 15 produces an overhead fraction containing substantially all of the hydrogen chloride and isobutane and a greater portion of the unconverted normal butane charge and a bottom fraction substantially hydrogen chloride-free and containing higher boiling hydrocarbons, a minor portion of the unconverted butane and at least a greater portion of the aluminum chloride introduced through line 75. The overhead fraction is directed through line 17 containing valve 18 through condenser 19 and the condensed product is accumulated in receiver 20.

Pump 23 takes suction from receiver 20 through line 22 containing valve 21 and discharges through valve 24 into fractionator 25 wherein an overhead fraction is obtained containing substantially all of the hydrogen chloride. Although not shown in the drawing, a portion of the liquid condensate in receiver 20 may be recycled to fractionator 15 as reflux to increase the degree of separation. Small amounts of light gases such as ethane and propane formed during the isomerization action may be withdrawn from the system through line 33 containing valve 34 to prevent a build-up of these materials in the system. Small amounts of hydrogen chloride withdrawn along with these gases may be recovered and recycled. The overhead product from fractionator 25 is directed through line 26 through condenser 27 and valve 29 into receiver 30 wherein condensable hydrocarbons are separated from the hydrogen chloride stream. Column 25 may be refluxed in the usual manner to increase the degree of fractionation. The condensed hydrocarbons from receiver 30 may be recycled through line 31 containing valve 32 into receiver 20.

Column 25 will be operated under a pressure substantially in excess of the pressures used in reactor 10 and fractionator 15. Higher temperatures may be used safely and with advantage during the fractionation in column 25 since substantially no aluminum chloride is present in the bottoms to react with the hydrocarbons to form sludge. This high pressure operation not only increases the degree of separation of the hydrogen chloride from the hydrocarbons, but also permits the return of the hydrogen chloride to the reactor without the utilization of a compressor for increasing the pressure of the returning stream. Hydrogen chloride makeup or the initial charge of hydrogen chloride necessary when the plant is placed in operation may be introduced through line 28 containing valve 76 into line 9.

The bottoms from column 25 comprising essentially isobutane and unconverted normal butane are directed through line 36 containing valve 37 into fractionator 38 wherein the isobutane is separated from the unconverted normal butane. A portion of the bottoms may be recycled through line 70 containing valve 71 into line 17 to provide sufficient liquid to dissolve the hydrogen chloride in the overhead stream from fractionator 15. The isobutane is withdrawn from fractionator 38 through line 39 containing valve 40 and is cooled, condensed and collected as a product of the reaction. The normal butane is withdrawn through line 41 containing valve 42 and is recycled to the reactor through line 49.

To prevent a build-up of higher boiling materials in the system, a portion of the stream withdrawn from fractionator 15 through line 4 is directed through line 43 containing valve 44 into treater 45 wherein the aluminum chloride is removed by caustic washing or any other well-known method. The aluminum chloride-free hydrocarbons are directed through line 46 containing valve 47 into fractionator 48 wherein the normal butane is separated from the higher boiling hydrocarbons. The separated normal butane is directed through line 49 containing valve 50 and is recycled along with the normal butane from fractionator 38 to either aluminum chloride supply tower 6 or reactor 10 as desired.

The isomerization reaction is mildly exothermic and in order to provide a substantially constant conversion temperature in reactor 10, a portion of the recycle stream from line 49 is withdrawn through line 63 and is directed at intermediate points in reactor 10 through lines 64, 65 and 66, containing valves 67, 68 and 69 respectively, as a quenching stream. The remaining portion of the recycle butane may be pumped by pump 55 through line 56 containing valve 57 through heater 58 into line 9 wherein it is commingled with the recycled hydrogen chloride. This stream may be utilized as a heat control medium since, if so desired, it may be raised to a higher temperature than the stream passing through the aluminum chloride supply tower 6 and upon commingling with the stream from tower 6, it will furnish the heat necessary to maintain the entire stream of reactants entering reactor 10 at the desired temperature level.

The amount of aluminum chloride carried from tower 6 is dependent, primarily, upon the temperature of the hydrocarbon stream entering the tower which will control the solubility of the aluminum chloride in said stream and the quantity of said stream which will control the actual amount removed. If it is desired to maintain a relatively low temperature in tower 6, a portion of the recycle stream may be directed into said tower through line 59 containing valve 60 to increase the quantity of normal butane passed through the tower, thereby increasing the amount of aluminum chloride carried into reactor 10 in solution in the hydrocarbon.

The bottoms from fractionator 48 containing pentanes and higher boiling hydrocarbons are withdrawn through line 51 containing valve 52 cooled and recovered as a product of the reaction. The bottoms from column 15 containing aluminum chloride dissolved therein are recycled through line 4 containing valve 16 through pump 77 which discharges through line 53 through either valve 54 or valve 62 contained in line 61.

The following example is given to illustrate the type of results obtainable in the operation of the process described in the foregoing specification, but without any intention of limiting the scope of the invention in exact accordance therewith.

*Example*

The charge to the plant consists of 94 mol percent of normal butane, 5 mol percent isobutane, and 1 mol percent of pentanes. The temperature of the aluminum chloride supply tower is about 160° F., and the temperature of the packed reaction chamber is about 200° F. The pressure in both the aluminum chloride supply tower and reaction zone is maintained around 400 pounds per square inch gauge. The hydrocarbon charge is introduced to the reaction zone at a liquid hourly space velocity of 0.3 volumes of charge per hour per volume of packed space in this zone, and the hydrogen chloride is maintained in the reaction zone in an amount of 13 mol percent of the charge by recycling and the use of makeup.

The fractionator following the reactor which separates the aluminum chloride carried into said reactor in the reaction products prior to the separation of the hydrogen chloride is operated under a pressure of 300 pounds per square inch gauge and at a bottom temperature of 230° F. and a top temperature of 205° F. The hydrogen chloride fractionator is operated under a pressure of 450 pounds per square inch gauge and the bottom temperature is maintained at 270° F. with a top temperature of 110° F.

From the above operation, the following yields are obtained:

| | |
|---|---|
| Ethane, mol percent | 0.3 |
| Propane, mol percent | 0.9 |
| Isobutane, mol percent | 40.1 |
| Normal butane, mol percent | 56.9 |
| Pentanes, mol percent | 1.8 |

The use of the aforesaid conditions and the process flow described results in substantially complete avoidance of operating difficulties due to undesired deposition of aluminum chloride, thereby permitting an unusually prolonged continuous period of operation at a substantially constant rate of conversion.

I claim as my invention:

1. An isomerization process which comprises contacting a saturated hydrocarbon in a reaction zone with a metal halide isomerizing catalyst under isomerizing conditions and in the presence of a hydrogen halide, separating the resultant products into a metal halide sludge and a hydrocarbon mixture containing free metal halide and hydrogen halide, fractionating the sludge-free mixture under conditions to separate a vaporous overhead product containing isomerized hydrocarbon and hydrogen halide from a solution of free metal halide in hydrocarbon liquid higher boiling than said saturated hydrocarbon, returning said solution to the reaction zone, further fractionating said vaporous overhead product to separate hydrogen halide gas from the isomerized hydrocarbon, and supplying thus separated hydrogen halide to the reaction zone.

2. The process of claim 1 further characterized in that said isomerizing catalyst comprises an aluminum halide.

3. The process of claim 1 further characterized in that said metal halide catalyst comprises aluminum chloride.

4. An isomerization process which comprises contacting a paraffinic hydrocarbon in a reaction zone with an aluminum halide catalyst under isomerizing conditions and in the presence of a hydrogen halide, separating the resultant products into an aluminum halide sludge and a hydrocarbon mixture containing free aluminum halide and hydrogen halide, fractionating the sludge-free mixture under conditions to separate a vaporous overhead product containing isomerized hydrocarbon and hydrogen halide from a solution of free metal halide in hydrocarbon liquid higher boiling than said paraffinic hydrocarbon, returning said solution to the reaction zone, further fractionating said vaporous overhead product to separate hydrogen halide gas from the isomerized hydrocarbon, and supplying thus separated hydrogen halide to the reaction zone.

5. The process of claim 4 further characterized in that said paraffinic hydrocarbon within said reaction zone is maintained in a liquid-vapor phase.

6. The process of claim 4 further characterized in that said paraffinic hydrocarbon within said reaction zone is maintained in a substantially liquid phase.

7. The process as defined in claim 4 further characterized in that the halogen of said aluminum and hydrogen halides is chlorine.

8. An isomerization process which comprises contacting normal butane in a reaction zone with aluminum chloride under isomerizing conditions and in the presence of hydrogen chloride, separating the resultant products into an aluminum chloride sludge and a hydrocarbon mixture containing free aluminum chloride and hydrogen chloride, fractionating the sludge-free mixture under conditions to separate a vaporous overhead product containing isobutane and hydrogen chloride from a solution of free aluminum chloride in hydrocarbon liquid higher boiling than said normal butane, returning said solution to the reaction zone, further fractionating said vaporous overhead product to separate hydrogen chloride gas from the isobutane, and supplying thus separated hydrogen chloride to the reaction zone.

JOHN O. IVERSON.